(No Model.)
O. W. SCHMIDT.
DRIVING OR STOP MECHANISM.
No. 409,068. Patented Aug. 13, 1889.
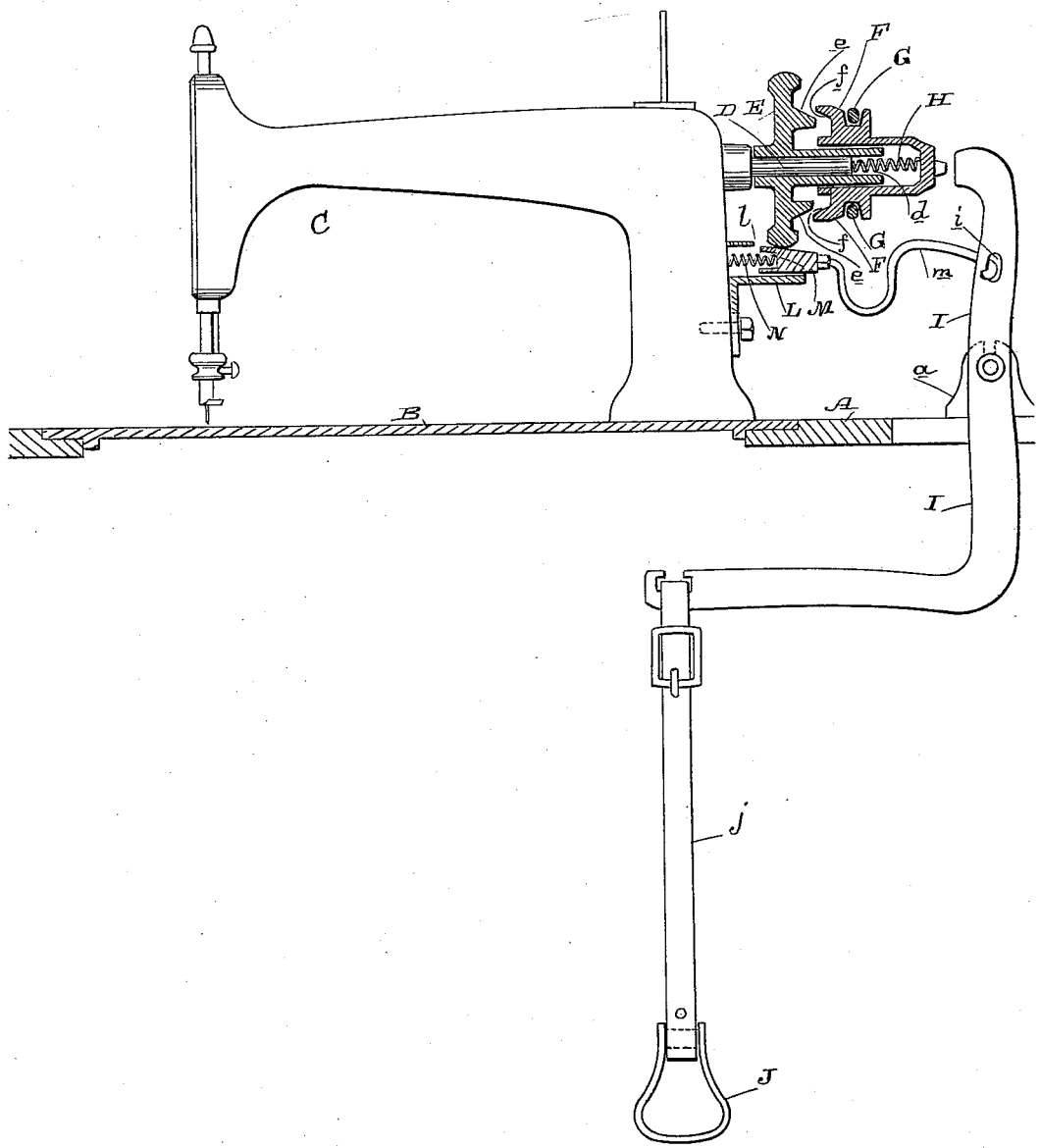
Witnesses
Geo. H. Strong
Inventor,
Oscar W. Schmidt
By Dewey & Co
Attys

UNITED STATES PATENT OFFICE.

OSCAR W. SCHMIDT, OF SAN FRANCISCO, CALIFORNIA, ASSIGNOR OF ONE-HALF TO ISRAEL S. COHEN, OF SAME PLACE.

DRIVING OR STOP MECHANISM.

SPECIFICATION forming part of Letters Patent No. 409,068, dated August 13, 1889.

Application filed February 23, 1889. Serial No. 300,924. (No model.)

*To all whom it may concern:*

Be it known that I, OSCAR W. SCHMIDT, of the city and county of San Francisco, State of California, have invented an Improvement in Driving or Stop Mechanisms; and I hereby declare the following to be a full, clear, and exact description of the same.

My invention relates to that class of mechanisms adapted for throwing machinery into and out of connection with the power device, and for stopping the machinery positively when disconnected; and my invention consists in the constructions and combinations of devices, which I shall hereinafter fully describe and claim.

Referring to the accompanying drawing for a more complete explanation of my invention, the figure is a section and elevation of my mechanism.

A is the table of the machine. B is its bed-plate, and C denotes the sewing-machine. D is its drive-shaft.

Upon the end of the drive-shaft is a fast wheel E, the outer face of which is provided with a friction-flange $e$. Mounted loosely upon the drive-shaft D, or, as here shown, on the hub of the fast wheel, is a friction-clutch pulley F, having a grooved rim for receiving the driving-belt G, and a friction-socket $f$ on its inner face, adapted to engage the friction-flange $e$ of the wheel E.

In the hub of the fast wheel is a socket $d$, in which is seated a spring H, which bears within the hub of the friction-clutch pulley F and acts to hold said pulley back and keep it normally out of engagement with the friction-wheel E.

Pivoted to a bracket $a$ on the table A is a lever I, the upper end of which bears against the hub of the friction-clutch pulley F. Its lower end is bent horizontally and has connected with it the strap $j$ of the treadle-stirrup J.

The operation of these parts is as follows: When the operator wishes to throw the machine into gear or connection with the power, he presses down on the treadle-stirrup J, and this, through its strap $j$, throws the upper end of the lever I inwardly, so that said end pressing on the friction-clutch pulley F causes its friction-socket $f$ to fit over and frictionally engage the flange $e$ of wheel E, whereby the shaft D is driven. As soon as he releases the stirrup, the spring H throws the clutch-pulley F out of engagement with the wheel E, so that the machine is thereby disconnected from the power.

Now, in order to fully and immediately check and stop the momentum of the drive-shaft, I have the following construction: Secured to the leg $c$ of the machine is a bracket L, having in its top a socket $l$, in which is seated and adapted to slide a friction-brake shoe M. From this shoe projects outwardly an arm $m$, the outer end of which engages an elongated slot $i$ in the lever I. A spring N is seated in the socket $l$ back of the brake-shoe and acts upon it, so as to hold it normally in engagement with the rim of the wheel E on the drive-shaft D.

The operation is as follows: When the lever I is made to throw the clutch-pulley F into engagement with the wheel E to start the machine, as hereinbefore described, said lever also, through the arm $m$, forces in the brake-shoe M out of engagement with the rim of wheel E and holds it there while the machine is running; but as soon as the lever I is relieved, so as to disconnect the power, the spring N throws the brake-shoe out again to engage the rim of the wheel E, thereby instantly and positively stopping the machine.

Having thus described my invention, what I claim as new, and desire to secure by Letters Patent, is—

1. The combination, with the drive-shaft of a machine, of the friction-wheel E, fast upon the drive-shaft and having a socket in its hub, the adjacent clutch-pulley sliding upon the hub of the fixed wheel and having a socket in its hub, the spring within the hubs of the fixed wheel and clutch-pulley, the pivoted lever engaging the pulley for forcing it into frictional engagement with the fixed wheel, and a treadle-connection with the lever, substantially as described.

2. The combination, with the drive-shaft of a machine, of the fixed and sliding wheels and the lever for forcing them into engagement with each other, the sliding brake-shoe fitted to move in a bracket secured to the machine and having an arm connected with the main lever, and a spring in the bracket for projecting the brake-shoe into engagement with the rim of the fixed wheel when the power is removed from the treadle, substantially as described.

In witness whereof I have hereunto set my hand.

OSCAR W. SCHMIDT.

Witnesses:
C. D. COLE,
J. H. BLOOD.